United States Patent
Klinger et al.

(10) Patent No.: US 9,436,162 B2
(45) Date of Patent: Sep. 6, 2016

(54) METHOD FOR ADJUSTING THE OSCILLATION FREQUENCY AND/OR ADJUSTING THE INERTIA AND/OR BALANCING OF A MOVABLE TIMEPIECE MOVEMENT COMPONENT OR OF A TIMEPIECE SPRING BALANCE ASSEMBLY

(75) Inventors: Laurent Klinger, Bienne (CH); Thorsten Kramer, Lueterkofen (CH); Marc Lippuner, Grenchen (CH); Thierry Conus, Lengnau (CH); Marco Verardo, Les Bois (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 578 days.

(21) Appl. No.: 13/808,179

(22) PCT Filed: Jul. 12, 2011

(86) PCT No.: PCT/EP2011/061851
§ 371 (c)(1),
(2), (4) Date: Jun. 21, 2013

(87) PCT Pub. No.: WO2012/007460
PCT Pub. Date: Jan. 19, 2012

(65) Prior Publication Data
US 2013/0272100 A1 Oct. 17, 2013

(51) Int. Cl.
G04B 17/20 (2006.01)
G04D 7/08 (2006.01)
G04D 7/00 (2006.01)

(52) U.S. Cl.
CPC .............. *G04D 7/082* (2013.01); *G04B 17/20* (2013.01); *G04D 7/004* (2013.01); *G04D 7/087* (2013.01); *G04D 7/088* (2013.01)

(58) Field of Classification Search
CPC ........ G04D 7/08; G04D 7/004; G04D 7/082; G04D 7/087; G04D 7/088; G04B 17/20; G04B 17/22; G04B 17/28
See application file for complete search history.

(56) References Cited

U.S. PATENT DOCUMENTS

| 2,538,528 A | 1/1951 | Kohlhagen |
| 3,225,586 A | 12/1965 | Reber, Jr. |

(Continued)

FOREIGN PATENT DOCUMENTS

| CH | 1035/60 | 10/1962 |
| CH | 390 165 | 7/1965 |
| CH | 526 097 | 3/1972 |
| CH | 609 195 | 2/1979 |
| CH | 690 874 | 2/2001 |
| CN | 101218547 | 7/2008 |

(Continued)

OTHER PUBLICATIONS

International Search Report Issued Nov. 9, 2012 in PCT/EP11/61851 Filed Jul. 12, 2011.

*Primary Examiner* — Vit W Miska
(74) *Attorney, Agent, or Firm* — Oblon, McClelland, Maier & Neustadt, L.L.P.

(57) ABSTRACT

A method for adjusting an oscillation frequency of a sprung balance assembly, in which a removal or a displacement of material is conducted on a component of this sprung balance assembly under an effect of a pulse of a laser source to conduct a micromachining or microfusion operation on the material of this component to vaporize or displace this material. This pulse is controlled by a controller configured to generate, sequence, interrupt any pulse and to control movements of a beam of this laser source, and the controller is automatically controlled by a measuring or comparing mechanism.

24 Claims, 2 Drawing Sheets

(56) References Cited

U.S. PATENT DOCUMENTS

| | | | |
|---|---|---|---|
| 3,727,027 A * | 4/1973 | Kaiser et al. | 219/121.69 |
| 4,259,563 A * | 3/1981 | Madeley | 219/121.69 |
| 6,534,742 B2 | 3/2003 | Serex | |
| 6,609,822 B1 * | 8/2003 | Tokoro et al. | 368/171 |
| 2002/0070203 A1 * | 6/2002 | Serex | 219/121.69 |

FOREIGN PATENT DOCUMENTS

| | | |
|---|---|---|
| DE | 1 142 796 | 5/1957 |
| EP | 1 172 714 | 1/2002 |
| EP | 1 213 628 | 6/2002 |
| FR | 1 589 411 | 3/1970 |
| FR | 2 159 367 | 6/1973 |

* cited by examiner

METHOD FOR ADJUSTING THE OSCILLATION FREQUENCY AND/OR ADJUSTING THE INERTIA AND/OR BALANCING OF A MOVABLE TIMEPIECE MOVEMENT COMPONENT OR OF A TIMEPIECE SPRING BALANCE ASSEMBLY

CROSS-REFERENCE TO RELATED APPLICATIONS

This is a National Phase Application in the United States of International Patent Application PCT/EP2011/061851 filed Jul. 12, 2011, which claims priority on Swiss Patent Application No. 01193/10 of Jul. 16, 2010, Swiss Patent Application No. 01194/10 of Jul. 16, 2010, Swiss Patent Application No. 01192/10 of Jul. 16, 2010 and Swiss Patent Application 00548/11 of Mar. 25, 2011. The entire disclosures of the above patent applications are hereby incorporated by reference.

FIELD OF THE INVENTION

The invention relates to a method for adjusting the oscillation frequency and/or adjusting the inertia and/or balancing of a movable timepiece movement component or of a timepiece sprung balance assembly.

The invention also relates to the application of this method to the adjustment of the oscillation frequency of a timepiece sprung balance assembly comprising at least one balance that comprises a peripheral rim and at least one spiral spring attached to one another at a collet, wherein said sprung balance assembly is able to pivot around a balance axis.

The invention further relates to a timepiece sprung balance assembly without index-assembly arranged to implement this method for adjusting its oscillation frequency.

The invention also relates to a device for implementing this method.

The invention relates to the field of micromechanics, and more particularly to the field of watchmaking.

Specifically, the invention relates to the adjustments and controls of regulating organs and in particular the balances of watches or timepieces, and in particular watch or timepiece sprung balance assemblies.

BACKGROUND OF THE INVENTION

In spite of the extreme precision of machining operations and their high reproducibility, adjustments must nearly always be made either during an assembly operation or, more frequently, during an adjustment or setting operation, in particular for adjustment of the frequency, adjustment of unbalance or an adjustment of inertia in the case of movable pieces.

It is at the assembled stage in particular that it is necessary to perfect the pairing of certain components, which when taken independently are within machining or production tolerances, but which cannot be assembled purely because of the service stresses specific to the mounted assembly.

This is particularly the case with the regulating organs of timepieces, and more specifically with sprung balance assemblies. In fact, it appears that the unbalance adjustments and inertia adjustments, both static and dynamic, are already very delicate at the individual component stage and that these setting operations turn out to be particularly complex when the components are assembled together. In particular, dynamic adjustments prove to be complicated to implement, in particular frequency adjustment.

The situation is even more complex when such an assembly is already integrated into a larger assembly such as a watch movement, for example, because of the poor accessibility, but also because of the disturbance to proper operation of the movement caused by performing an adjustment, control or balancing operation.

There is therefore a dual difficulty, since it is a matter of being able to manage the dynamic controls and adjustments on components, which are:

moving, or integrated into a timepiece movement, or moving and integrated into a timepiece movement.

The problems associated with dynamic balancing are still the domain of an extremely limited number of specialists in industry, which can be verified by the paucity of industrial balancing machines available globally. The field of micromechanics can only magnify this phenomenon, since the pieces to be balanced have a very low mass in the order of one gram or decigram and have inertia tolerances in the microgram×square centimeter range. This has nothing to do with the field of using balancing machines for the wheels of motor vehicles, which are the mot numerous, or machines dedicated to heavy industry, railways or high-speed processing.

The problems associated with dynamic balancing have long been the inspiration for solutions relating to localising zones of the addition or removal of material and to quantifying these additions and removals, which are performed after stoppage of the rotation of the movable element to be balanced, as in the patent document U.S. Pat. No. 2,538,528 in the name of Kohlhagen. In a variant, as in the patent document DE 1 142 796 in the name of Hettich, elements have to be positioned or conversely to be pressed into pre-drilled holes over the entire circumference of a watch balance. Patent CH 367 444 in the name of OMEGA shows the disadvantages of traditional removal by milling on watch balances and proposes a solution of adding or removing material by electrochemical means, as a result of which correction of the mass and the precision of the balancing can be assured.

U.S. Pat. No. 3,225,586 in the name of HAMILTON proposes the use of the microphone of a "Watchmaster" type of machine connected to the rotatable meter to very precisely determine the adjustment of 4 screws on the periphery of the rim of the balance.

To improve these processes in two steps: measurement then adjustment, a patent CH 390 165 in the name of Zenger proposes a process for balancing by electro-erosion continuously with a very slight delay after a stroboscopic measurement, but this requires a rotation in a uniform direction of this balance.

Patent CH 690 874 in the name of Witschi also describes a process for the removal or addition of material following a preliminary measurement with a stop device of the balance to hold it to face removal or adding devices.

Patent CH 526 097 in the name of the Compagnie Générale d'Electricité proposes a balancing of a turning or oscillating piece by beam parallel to the pivot axis of the piece to be balanced comprising an optical device for deviation of the beam such that this is synchronous with the moving piece, and to thus vaporise the material at the appropriate location for the whole duration of the pulse emitted by the laser. This technology represents significant progress in relation to the prior art, but is not well suited to a component mounted in an assembly because of the waste material and contamination of the assembly.

The same applies for patent FR 2 159 367 in the name of Les Fabriques d'Assortiments Réunies, which proposes a machining process with minimisation of the number of operations, but wherein the position of the machining head depends on the fault to be corrected, which is not possible in a mounted assembly.

Overall, the known processes capable of conducting a correction of inertia or balancing or other physical magnitude such as the rigidity of a spring on a moving piece are rare and ill-suited to conducting this correction on this same piece mounted in an assembly. Moreover, they are little suited to an alternating movement, which applies to a balance or a mounted sprung balance assembly.

U.S. Pat. No. 6,534,742 in the name of ETA SA Fabrique d'Ebauches proposes a method for adjusting the oscillation frequency of a spring balance by using a laser acting on the spiral spring to reduce its elastic torque by reducing it thickness or its height. While it represents obvious progress in relation to the prior art, this instruction does not resolve all the cases in question, since it can only create loss by weakening the spring. On the other hand, it can only be used outside the timepiece movement because of the contamination and waste materials generated by the action of the laser.

SUMMARY OF THE INVENTION

The invention proposes to provide a solution to this problem by developing a suitable process for dynamic control and adjustment of micromechanical components, in particular timepiece components, and in particular pivoting components in mounted assemblies, most particularly to conduct control operations for adjusting oscillation frequency and/or inertia adjustment and/or balancing of such a movable component of a timepiece movement, or in particular of a timepiece sprung balance assembly.

One of the particular aims of the invention is to omit the index assembly on spring balance adjustment assemblies.

In particular, the invention endeavours to propose an efficient, rapid and precise method for these control operations for adjusting oscillation frequency, inertia adjustments, adjustments of dynamic balancing or also control operations for adjusting spiral springs or similar, which is applicable in the case of components mounted in the larger assembly, in particular in a timepiece movement, and also that is applicable when this components are themselves moving.

The invention proposes to improve this situation by proposing a solution to this problem by developing a suitable process for dynamic control and adjustments on components, which are:
  moving, or
  integrated into a timepiece movement, or
  moving and integrated into a timepiece movement.

On this basis, the invention relates to a method for adjusting the oscillating frequency and/or adjusting inertia and/or balancing a movable component of a timepiece movement or of a timepiece sprung balance assembly, characterised in that a removal of material and/or an addition of material and/or a displacement of material is/are conducted on said component or at least one component of said assembly by using at least one transformation means comprising at least one laser or plasma source to conduct a micromachining and/or a microfusion operation on the material of said component or of said at least one component of said assembly and/or respectively of at least one addition material to vaporise and/or sublimate and/or displace and/or respectively weld at least one addition material onto said component or onto said at least one component of said assembly under the effect of at least one pulse of said transformation means, and that said at least one pulse is controlled by control means arranged to generate, sequence, interrupt any pulse of said at least one transformation means, wherein said control means are also arranged to control the movements of at least one beam discharged from said transformation means, wherein said control means are connected to measuring or comparing means or are automatically controlled by said measuring or comparing means.

According to a characteristic of the invention, said measuring or comparing means are arranged to conduct measurements on said component or said at least one component of said assembly during a movement of said component or of said assembly.

According to another characteristic of the invention, said control means are programmed in order to define at least one particular zone of the surface of said component or of said at least one component of said assembly, at which the material is to be removed and/or added and/or displaced, and in that said control means are programmed in order to generate at least one pulse sequence at high average frequency of said transformation means in order to generate over said zone at least one line of successive impacts of a beam emitted by said at least one transformation means.

According to another characteristic of the invention said component or said assembly is caused to pivot around its main axis of inertia during said at least one pulse sequence of said transformation means, and in that said measuring or comparing means are used for the purposes of measuring or comparing the dynamic inertia of said component around the main axis of inertia of said component or said assembly.

According to another characteristic of the invention a single transformation means is used, and amplitude stabilising means are used to maintain the pivoting movement of said component or said assembly in an oscillation at constant amplitude during the course of each pulse sequence.

According to another characteristic of the invention said amplitude is stabilised at an angle with a value of 137° or 316.5°.

According to another characteristic of the invention a displacement of material within the component or at least one component of said assembly is conducted either by localised melting followed by a displacement of the melting zone followed by solidification cooling, or by creating or relaxing internal stresses during a thermal treatment or under the effect of an external force, or by bending a deformable zone or a lug or a pin, or by spreading of the material.

According to another characteristic of the invention the displacement of material is conducted by localised melting followed by a displacement of the melting zone followed by solidification cooling, wherein the displacement of the melting material is conducted either by gravity, or under the action of centrifugal force during the adjustment of operation, or under the effect of a magnetic and/or electrostatic attraction force.

According to another characteristic of the invention a localised physical change of state of the material forming said component or at least one component of said assembly is performed to modify its inertia by local modification of its geometry and/or its density.

According to another characteristic of the invention said removal of material and/or addition of material and/or displacement of material on said component or said at least one component of said assembly is conducted with said component or said at least one component of said assembly assembled in a timepiece movement.

According to another characteristic of the invention this process is applied for adjusting the oscillation frequency of a timepiece sprung balance assembly comprising at least one balance comprising a peripheral rim and at least one spiral spring attached to one another at a collet, wherein said sprung balance assembly is able to pivot around a balance axis, characterised in that a removal and/or an addition and/or a displacement of material is/are conducted to conduct the adjustment of the oscillation frequency of said sprung balance assembly, and that said method comprises a first process in which:

the gain or loss of said sprung balance assembly is evaluated in relation to a desired oscillation frequency;

said control means are programmed in order to define at least one particular zone, at which the material must be removed and/or added and/or displaced, as applicable, in a first alternative in the case of the need to create gain, said zone is defined at said rim of said balance or at components or inertia blocks or studs or screws carried by said balance, or in a second alternative in the case of the need to create loss, said zone is defined at the at least one coil of said spiral spring;

said control means are programmed in order to generate, as applicable, a gain by a reduction of inertia by removing material on said balance, or a gain by modifying the rigidity of said spiral spring by adding material to said spiral spring, or a gain by displacing material at said balance or said spiral spring, or a loss by an increase of inertia by adding material to said balance, or a loss by modifying the rigidity of said spiral spring by removing material on said spiral spring, or a loss by displacing material at said balance or said spiral spring.

According to another characteristic of the invention said control means are programmed in order to create gain on said balance by repeating microengraving operations on said zones in order to reach a desired frequency value, which can be controlled by said measuring or comparing means, and in order to generate said microengraving operations on said zones for the balancing of said spring balance in relation to its main axis of inertia in relation to a desired value, which can be controlled by said measuring or comparing means, and said control means are programmed in order to create loss by modifying the rigidity of said spiral spring without modifying its crystalline structure or its thermal coefficient by microengraving conducted under the action of at least one pulse sequence of at least one of said transformation means to thin out at least one coil of said spiral spring and/or the twisted part of a terminal end when said spiral spring has one.

The invention also relates to a timepiece sprung balance assembly without index-assembly arranged to implement this method for adjusting its oscillation frequency, characterised in that it comprises either a plurality of inertia blocks made in a form that allows standard tools to be used in after-sales service and configured to be either identical and positioned on the same diameter or on different diameters, or different and positioned on the same diameter or on different diameters, or one or more closed internal chambers specifically for the displacement or repositioning of melting material, or a surface layer or sacrificial parts, or pre-stress zones that can be relaxed under application of an external force, or zones capable of occupying different physical states under the effect of a thermal treatment, or electrified and/or magnetised zones, or polymetallic zones with variable stresses distribution.

The invention also relates to a device for implementing this method, characterised in that it comprises at least one laser or pico-laser source forming said transformation means, control means for said source arranged to generate, sequence, interrupt at least one pulse sequence of said laser or pico-laser, wherein said control means are also arranged to control the movement of at least one beam discharged from said laser or pico-laser or the movement of said source itself, measuring and comparing means interfaced with said control means, and gripping and supporting means for a component or an assembly to be micromachined, driving means for pivoting said component or said assembly, which are interfaced with said control means, amplitude stabilising means for maintaining the pivoting movement of said component or said assembly in an oscillation of constant amplitude, and that it comprises means for evacuating gases and/or waste materials associated with a sublimation of material by pressure difference.

BRIEF DESCRIPTION OF THE FIGURES

Other characteristics and advantages of the invention will become clearer from reading the following detailed description with reference to the attached drawings, wherein.

DETAILED DESCRIPTION OF PREFERRED EMBODIMENTS

The invention relates to a method for adjusting the oscillation frequency and/or adjusting the inertia and/or balancing of a movable micromechanical or timepiece movement component or of a timepiece sprung balance assembly, in particular by micromachining and/or adding material and/or displacing material.

The invention also relates to the application of this method to a timepiece spring balance without index-assembly.

The invention also relates to a device for implementing this method.

The invention also relates to a timepiece spring balance without index-assembly adjusted by oscillation control according to this method, and more particularly designed to take advantage of certain particular characteristics of this method, in particular in the case of displacement of material.

In general, the invention relates to the field of micromechanics and more specifically to the field of watchmaking.

Specifically, the invention relates to the adjustments and fine adjustments of regulating organs and in particular the balances of watches or timepieces, and in particular watch or timepiece sprung balance assemblies.

The invention relates to a method for adjusting the oscillation frequency and/or adjusting the inertia and/or balancing of a movable timepiece movement component or of a timepiece sprung balance assembly, characterised in that a removal of material and/or an addition of material and/or a displacement of material is/are conducted on said component or at least one component of said assembly by using at least one transformation means comprising at least one laser or plasma source to conduct a micromachining and/or a microfusion operation on the material of said component or of said at least one component of said assembly and/or respectively of at least one addition material to vaporise and/or sublimate and/or displace and/or respectively weld at least one addition material onto said component or onto said at least one component of said assembly under the effect of at least one pulse of said transformation means, and that said at least one pulse is controlled by control means arranged to generate, sequence, interrupt any pulse of said at least one transformation means, wherein said control means are also arranged to control the movements of at least one beam discharged from said transformation means, wherein said control means are connected to measuring or comparing means or are automatically controlled by said measuring or comparing means.

Advantageously, at least one laser or pico-laser is chosen as such a transformation means to perform a removal of material by microengraving under the effect of at least one pulse of this laser or pico-laser in order to directly transform solid material of the component in question into a gaseous flux by sublimation, and a pressure difference is established on either side of this component during its treatment using this laser or pico-laser in order to evacuate the gases and/or waste materials associated with the sublimation.

This method preferably relates to the adjustment or control of the oscillation frequency and/or inertia and/or balancing of a movable component of a timepiece movement that pivots around a pivot axis of either a timepiece balance that comprises a peripheral rim and is able to pivot around a balance axis, or a timepiece sprung balance assembly comprising at least one balance, which comprises a peripheral rim and at least one spiral spring attached to one another at a collet, wherein said sprung balance assembly is able to pivot around a balance axis.

In order to conduct micromachining operations simultaneously with measurement or comparison operations without disassembly, it is necessary to utilise means for removing and/or adding material and/or displacing material that act rapidly in relation to an action controlled by a chain of measurement or comparison. In a particular practical example of the invention these operations of micromachining and/or addition of material and/or displacement of material can be conducted in real time with measurements and/or comparisons as part of a closed-loop system. However, the method is also designed to process the result of previous measurements or comparisons at least with slight delay. Good results are obtained by processing the measurement and ablation operations and/or addition of material and/or displacement of material with delay and alternately.

The method according to the invention advantageously uses a combination of ablation and addition of material on components forming the timepiece movable part, in particular a spring balance, or on components that carry this movable part or this spring balance such as inertia blocks, screws, index or other, or on these single components and the spiral excluding the balance.

In an alternative innovative special embodiment of the invention this method uses a displacement of material at the level of the or these components.

In another advantageous variant the displacement of material is combined with a combination of ablation and addition of material.

One of the aims of the invention is to enable the index-assembly to be omitted. The possibilities of adjustment of the oscillation frequency and control of inertia proposed by the invention allows this aim to be achieved.

Ablation is understood here to mean any removal of material performed by any method.

One of the aims of the invention is to make the micromachining and/or addition of material and/or displacement of material both very rapid and precise, both in its geographic localisation and in the quantity of material removed, to arrive very rapidly at a final result with one to two intermediate measurements or comparisons only.

This also concerns conducting a micromachining and/or a micro-addition of material and/or a displacement of material that is perfectly neat and clean and without any solid waste material remaining.

In a particular variant the invention defines a method for adjusting a timepiece sprung balance assembly comprising at least one balance, which comprises a peripheral rim and at least one spiral spring attached to one another at a collet, wherein said sprung balance assembly is able to pivot around a balance axis.

Advantageously, this method is implemented in particular for the adjustment of the oscillation frequency of a timepiece sprung balance assembly.

According to the invention either a removal of material is conducted by transforming at least one part of the material of this component or this sprung balance assembly by ablation, in particular by sublimation, by using a suitable micromachining means to conduct the adjustment of inertia and/or balancing and/or oscillation frequency, or an addition of material by using a suitable spraying or depositing means and/or means for displacing material by modifying the intrinsic geography of the component in question.

The ablation of material by sublimation is the preferred method of implementing the invention with respect to the ablation of material, and in fact sublimation allows the zone where the removal of material is conducted to be kept clean. However, it is understood that an intermediate solution, which comprises a change from the solid phase to the liquid phase, possibly followed by a change from the liquid phase to the gaseous phase, also allows the desired result to be obtained and also constitutes an alternative method for implementing the invention.

Naturally, the case of vaporisation should also be considered, for example, if a liquid metal such as mercury is transformed into a gas with adequate precautions for collecting these gases.

Advantageously, at least a part of the material of this component or this sprung balance assembly or components that carry this sprung balance assembly is thus transformed by sublimation, i.e. a change of the component at least partially and preferably as completely as possible by sublimation, i.e. by direct change from the solid state to the gaseous state, without either solid or liquid waste materials being deposited onto the component again.

At least one laser or pico-laser, or indeed a femto-laser, is preferably chosen as such a micromachining means. A removal of material can also be conducted by microengraving under the effect of at least one pulse of this laser or pico-laser in order to directly transform the solid material into a gaseous flux by sublimation.

This pulse or preferably these pulses are controlled by control means, which are arranged to generate, sequence, interrupt any pulse of this laser or pico-laser or similar. These control means are also arranged to control the movements of at least one beam discharged from this laser or pico-laser, or also the movement of the pico-laser itself. These control means are interfaced or connected to measuring or comparing means or are also automatically controlled by such measuring or comparing means.

Micromachining by laser, in particular by pico-laser, is particularly effective for the present case of movable timepiece components, particularly when they are mounted in a movement, and when they are themselves moving. Alternative ablation means such as ion bombardment, electric arc or other methods can also be used without departing from the invention.

Plasma heating can allow ablation operations to be conducted or also the application of material by spraying in a gaseous flux such as a plasma torch or similar, or microplasma welding, and the cost of this is low.

In another variant, the deposition of material is conducted by melting a wire or similar onto a surface of the movable part in question.

The traditional machining technologies using cutting tools or grinding wheels are well known to the person skilled in the art and are not explained in detail here.

The process of adding material onto the timepiece component consists of depositing material of external origin onto the component and choosing as deposition means preferably either at least one laser or pico-laser, or a spray head to perform this addition of material, and controlling this pulse by control means arranged to generate, sequence, interrupt any pulse, as applicable, either of this laser or pico-laser or of said spray head, wherein said control means are also arranged to control the movements, as applicable, of either at least one beam discharged from this laser or pico-laser, or from said spray head, wherein these control means are connected to the measuring or comparing means or are also automatically controlled by these measuring or comparing means.

The measuring or comparing means are chosen and are arranged to conduct measurements, preferably at least of the inertia and oscillation frequency, on this component both in the stoppage position and during a movement of this component.

The invention implements conditions to directly transform material from a solid state into a volatile state, in particular by sublimation, without passing through a liquid state of the material, in particular by sublimation. Such a micromachining operation is possible thanks to the technology of athermal lasers such as pico-lasers or similar, which enable a beam to be directed onto a surface for a pulse of very short duration but with a very high energy density, which allows the material to be sublimated directly without passing through the liquid state of a melting process, or at least by largely avoiding passage through the liquid melting state, because it is inevitable that secondary effects result in local areas of microfusion that are then immediately solidified again at the level of the crater formed by the impact of the beam. This pulse duration is in the order of a picosecond, i.e. $10^{-12}$ second in the case of a pico-laser with an average power in the range of between 1 and 10 W, and within the framework of the invention durations ranging from some picoseconds to some tens or hundreds of picoseconds.

Sublimation provides the advantage of assuring that the work area is perfectly clean, which allows its use on a finished product that is already assembled. It is sufficient to channel the gases, for example, by creating a pressure difference around the work area, in particular in a continuous flow of gas and air, to collect the gases discharged during their sublimation to be processed or destroyed or evacuated, depending on their toxicity.

The invention thus consists of creating conditions of use of such an athermal laser in order to render the operation economically viable. In fact, it is understood that the quantity of material sublimated on each pulse is very small, since the thickness removed is micrometric, which means that the micromachining time would be very long and prohibitive. In the case of a spring balance a succession of points cut through periodically because of an alternating sequence would require a much longer processing time to be profitable. Using such a picosecond laser, referred to as pico-laser, allows an ablation of material to be conducted on a balance rim or also on one or more components that this balance carries at the level of this rim such as studs, inertia blocks, adjusting screws or the like. This ablation of material reduces the inertia of this balance and thus enables any operating fault to be corrected.

Such a treatment is characterised by several parameters: simplicity of implementation, treatment time for conducting a given correction, creation of a possible unbalance, need to conduct certain measurements etc.

The present document presents a strategy for ablation on a moving spring assembly, i.e. during its pivoting movement around its balance axis. By implementing this new method, the invention proposes to conduct the frequency adjustment on this balance and/or its inertia adjustment and/or its balancing adjustment in order to cause this pivot axis of the balance or this spring balance to coincide with its main axis of inertia.

The present invention is developed so that it can equally be applied to a single balance, an assembled spring balance as well as a spring balance that is integrated and mounted in a timepiece movement.

The treatment time and the unbalance created are optimised as a result of this strategy.

Figure 3:
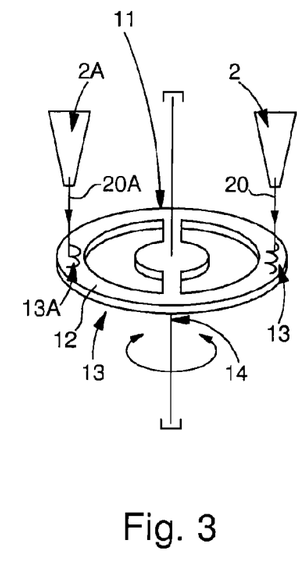
FIG. 3 schematically shows in part the simultaneous intervention of two lasers or pico-lasers during micromachining on a sprung balance assembly reduced to its single balance in the figure.
Figure 4:
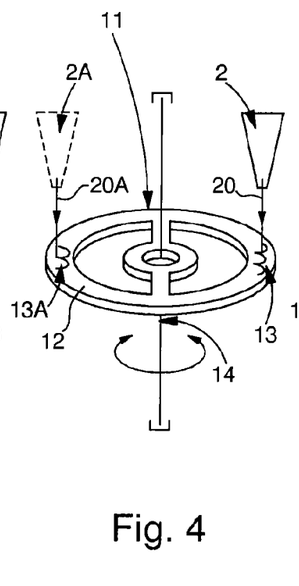
FIG. 4 shows in a similar view to FIG. 3 the delayed intervention of two such lasers or pico-lasers.
Figure 5:
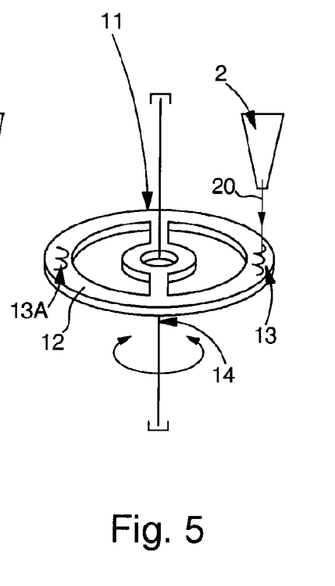
FIG. 5 shows in a similar view to FIG. 3 the intervention of a single such laser or pico-laser.

To implement a step of material ablation of the method for adjusting frequency and/or inertia and/or balancing of a timepiece balance that comprises a peripheral rim and is able to pivot around a balance axis, a removal of material by ablation is performed transforming at least a part of the material of this balance, preferably by sublimation, by using a micromachining means suitable to conduct the adjustment of inertia and/or balancing and/or frequency of this balance. At least a part of the material of the balance or of components that this balance carries is transformed by sublimation, and at least one pico-laser is chosen as such a micromachining means to conduct this removal of material by microengraving under the effect of at least one pulse of the pico-laser in order to directly transform the solid material into a gaseous flux by sublimation. This pulse or these pulses is/are controlled by control means that are arranged to generate, sequence, interrupt any pulse of this pico-laser, or these pico-lasers when several are used, as in the example in FIG. 3.

These control means are also arranged to control the movements of at least one beam discharged from this pico-laser or also the movements of the pico-laser source itself. Naturally, the control means control the movements of all pico-laser sources used in the implementation of this method. These control means are interfaced or connected to measuring or comparing means or are also automatically controlled by these measuring or comparing means.

Advantageously, the control means are programmed in order to define at least one particular zone of the surface of the component, in particular in the case of a balance the rim of the balance or components that this balance carries. This zone is that over which the material must be removed.

In the case of a spring balance this process is used to conduct the adjustment of oscillation frequency of a timepiece sprung balance assembly comprising at least one balance comprising a peripheral rim and at least one spiral spring attached to one another at a collet, wherein this sprung balance assembly is able to pivot around a balance axis, characterised in that a removal and/or an addition and/or a displacement of material is/are conducted to conduct the adjustment of the oscillation frequency of this sprung balance assembly, and it comprises a first process in which:

the gain or loss of said sprung balance assembly is evaluated in relation to a desired oscillation frequency;

said control means are programmed in order to define at least one particular zone, at which the material must be removed and/or added and/or displaced, as applicable, in a first alternative in the case of the need to create gain, said zone is defined at said rim of said balance or components or inertia blocks or studs or screws carried by said balance, or in a second alternative in the case of the need to create loss, said zone is defined at the at least one coil of said spiral spring;

said control means are programmed in order to generate, as applicable, a gain by a reduction of inertia by removing material on said balance, or a gain by modifying the rigidity of said spiral spring by adding material to said spiral spring, or a gain by displacing material at said balance or said spiral spring, or a loss by an increase of inertia by adding material to said balance, or a loss by modifying the rigidity of said spiral spring by removing material on said spiral spring, or a loss by displacing material at said balance or said spiral spring.

The control means are preferably programmed to conduct a removal of material, as applicable, on the balance or on the spiral spring by generating at least one pulse sequence at high average frequency of the transformation means, preferably a laser or pico-laser, in order to generate over this zone or these zones, as applicable, at least one line of successive impacts of the beam of the laser or pico-laser in order to conduct a microengraving operation there by localised removal of material, and/or these control means are programmed to conduct an addition of material and/or a displacement of material, as applicable, on the balance or the spiral spring.

This line of impacts is not necessarily straight or even continuous, and in fact is dependent on the relative movements of the component and the beam of the laser or pico-laser, or beams if there are several thereof.

It is understood that high average frequency of pulses of the laser or pico-laser is specified here because it is not essential that the frequency of the pulses is constant, in particular the generation of the pulses can be random or follow a particular rule of variation.

Thus, advantageously, a scanning effect is created, i.e. that in certain zones of the component its surface is subjected to a continuous sequence of pulses of the laser or pico-laser that is represented by the marking of a groove on the surface of the component. To create this scanning effect, at least the component or the direction of the beam of the laser or pico-laser is preferably moving during this pulse of the laser or pico-laser, and therefore the conditions of a plurality of pulses component are created in a particular geographic zone of the surface of the. It is preferable to cause the beam of the laser or pico-laser to move, since the spot should preferably shift at least by the value of its radius between two successive shots so that a later shot does not fall in the plasma bubble generated by the preceding shot, even if such a micromachining operation remains that possible.

In fact, it is conceivable to conduct a machining operation such as drilling using a laser or pico-laser without relative movement between the machined piece and the beam of the laser or pico-laser either when stopped or during synchronous movement with the aim of cleanliness in particular on the finished and assembled component, but it is necessary to move the pulses away sufficiently over time.

This first process can be, but is not necessarily, a first iterative process until a desired oscillation frequency is reached in a given tolerance.

The control means are programmed in order to define at least one particular zone of the surface of the component or of said at least one component of said assembly, over which material must be removed and/or added and/or displaced, and the control means are programmed in order to generate at least one pulse sequence at high average frequency of the transformation means in order to generate over this zone at least one line of successive impacts of a beam emitted by this at least one transformation means.

The control means are programmed in order to define at least one particular zone, over which material must be removed or added or displaced, as applicable, and preferably:

in a first alternative in the case where gain needs to be created, this zone is defined at the level of the rim of the balance or of components or inertia blocks or studs or screws that this balance carries;

or in a second alternative when loss needs to be created, this zone is defined at the level of at least one coil of the spiral spring.

In summary, programming of the control means is preferably conducted in order to generate, as applicable:

a gain by a reduction of inertia by removing material on the balance, or a loss by modifying the rigidity of the spiral spring by removing material on the spiral spring, or also a loss by increasing the inertia by adding material to the balance, or also a gain by modifying the rigidity of the spiral spring by adding material to the spiral spring.

These gains and losses can also be obtained by displacement of material in combination or not with ablation and/or addition of material.

It is also possible to conduct an addition of material or to combine ablation, displacement, addition of material conducted on the components forming the spring balance or on the components that it carries such as inertia blocks, screws or other.

In a preferred embodiment the control means are programmed in order to allow the evacuation of the plasma bubble of the preceding shot before any new shot. The whole advantage of a pulse sequence at high average frequency of the laser or pico-laser for generating over this zone at least one line, or preferably several lines, of successive impacts of the beam of the laser or pico-laser is understood.

This long path thus compensates the weakness of each pulse and enables a sufficient removal of material to be achieved overall to conduct the desired adjustment by localised microengraving.

It is understood that the process can be used in different ways:

a delayed treatment between the measurement and/or comparison phases, on the one hand, and the phases of micromachining and/or addition of material and/or displacement of material, on the other hand, or a simultaneous or semi-simultaneous treatment with the execution of certain measurement and/or comparison operations during the execution of certain operations of micromachining or micro-addition of material or displacement of material.

It is also understood that high average frequency of pulses of the laser or pico-laser is specified here because it is not essential that the frequency of the pulses is constant, in particular the generation of the pulses can be random or follow a particular rule of variation.

In a preferred exemplary embodiment the average frequency of the laser shots is in the range of between 50 Hz and 500 kHz, preferably in the range of between 100 kHz and 500 kHz and preferably in the order of 300 kHz.

For example, in an operation of inertia adjustment on a watch balance the number of pulses generated can be in the order of $10^5$ to $10^{10}$.

It is therefore necessary in order to obtain this scanning effect that at least the component or the direction of the beam of the laser or pico-laser is moving during this pulse sequence of the laser or pico-laser. It should be understood that it is the direction of the beam of the laser or pico-laser that is moving, since the laser or pico-laser source itself can remain fixed and the beam can be oriented by a set of mirrors controlled by piezoelectric elements or in the manner of a galvanometer towards the zone of the surface that is to be micromachined.

It is understood that it is sufficient to program the control means to define as many zones as necessary and to generate as many pulse sequences as necessary.

In a preferred application, in particular the adjustment of the inertia and/or balancing of an adjusting assembly such as the spring balance or one of its components, this component is moving during this pulse sequence of the laser or pico-laser. In order to increase the efficiency and rapidity of the process, the direction of the beam of the laser or pico-laser is preferably also moving during this same pulse sequence of the laser or pico-laser.

The control means take into account the geometry and the composition of the component to be micromachined and restrict the amplitude of the mobility of the beam and the generation of pulses so that the beam only comes into contact with the zones, where micromachining is possible, on the one hand, and desirable, on the other. In particular, in the example of adjusting the inertia and/or balancing of the spring balance the zones could be restricted to the periphery of the rim of the balance and in particular to the metal zones therein, in particular inertia blocks, studs or balancing screws, that this balance includes, since the aim of using the laser or pico-laser is to sublimate the metal material and not interact with other materials, in which the local increase in temperature could result in other undesirable effects and in particular create slag, dusts or the like. The definition of the permitted zones is advantageously achieved using polar coordinates with the definition of a range of radii and a range of angles at the centre.

Various possibilities present themselves with respect to causing the direction of the beam of the laser or pico-laser to move, more particularly when the component to be micromachined is able to pivot around a pivot axis:

in a simple configuration this movement occurs in one plane and the direction of the beam of the laser or pico-laser is caused to move in a radial plane in relation to a pivot axis of the component during this pulse sequence of the laser or pico-laser. For example, in the case of the adjustment of inertia and/or balancing of a spring balance this plane is advantageously chosen to be parallel to the pivot axis of the balance and the pattern of the micromachining operations on an annular portion of the rim, or preferably on studs assigned to this use, thus take the form of a beam of oblique or radial broken lines, which result from the combination of the two movements of the beam and the balance, and which come closer to straight lines if the chosen plane is radial in relation to the axis of the balance and if the rate of displacement of the beam in this plane is significantly higher than the tangential speed of the balance;

in a particular configuration and simple and preferred application the direction of the beam of the laser or pico-laser is caused to move so that the beam remains parallel to the pivot axis of the component;

in an other configuration the direction of the beam of the laser or pico-laser is caused to move three-dimensionally in a space encompassing a radial plane in relation to a pivot axis of the component during this pulse sequence of the laser or pico-laser, wherein this space is inscribed in a scanning cone. The pattern obtained is thus closer to a tangle of loops;

in a further configuration the direction of the beam of the laser or pico-laser is caused to move three-dimensionally during this pulse sequence of the laser or pico-laser, wherein this three-dimensional movement is comparable to that of a triaxial numerical control machine, although it is sufficient in practice to control two mirrors angularly to reach each point of the space. The pattern obtained is also closer to a tangle of loops, but a particular programming taking into account the respective velocity vectors of the beam and the component can enable the micromachining to be conducted according to a determined grid.

A sort of permanent scanning can thus be created in the zone in question and sufficient material can thus be removed.

Naturally, in the case where the component is fixed and where only the beam of the laser or pico-laser is movable, the latter can also be controlled using any one of these control methods described above.

In this regard, the use of a micromachining by laser or preferably by pico-laser also enables the component to be engraved in a manner that is almost invisible to the eye and, for example, allows certain anti-counterfeiting markings to be made.

The component is preferably caused to make a pivoting movement around its pivot axis during each pulse sequence of the laser or pico-laser. In the case of a timepiece adjusting mechanism, this pivoting movement is alternating.

In a particular practical example of the invention at least two transformation means are used, in particular lasers or pico-lasers, with symmetric beam movements either in relation to a plane passing through the main axis of inertia of the component or in relation to the main axis of inertia of the component. In particular, when the beam movements are symmetric in relation to the main axis of inertia, the conducted material removal operations are symmetric and no unbalance is created. Thus, these at least two lasers or pico-lasers should be synchronised and a stoppage of the micromachining should be generated if for any reason one of the lasers or pico-lasers ceases to emit. A useful precaution when working with two or more lasers or pico-lasers is to change these around in the micromachining operations they perform, since the beams are never strictly identical in contrast to beams resulting from the division of a single source.

Symmetric scanning is not necessarily even. It is possible, for example, to conduct scanning operations in three planes passing through the main axis of inertia of the component and each at 120°.

The pulse duration is preferably in the picosecond range, i.e. $10^2$ second in the case of a pico-laser with an average power in the range of between 1 and 10 W, and within the framework of the invention pulse durations ranging from some picoseconds to some tens or hundreds of picoseconds.

Advantageously, the control means are programmed in order to create gain on the balance by repeating microengraving operations over such zones in order to reach a desired frequency value, which can be controlled by the measuring or comparing means, and in order to generate said microengraving operations on these zones for the balancing of the spring balance in relation to its main axis of inertia in relation to a desired value, which can be controlled by the measuring or comparing means, and the control means are programmed in order to create loss by modifying the rigidity of the spiral spring without modifying its crystalline structure or its thermal coefficient by microengraving conducted under the action of at least one pulse sequence of at least one transformation means to thin out at least one coil of the spiral spring and/or the twisted part of a terminal end when said spiral spring has one.

In the first alternative the control means are programmed in order to create gain on the balance by repeating microengraving operations over this or these zones in order to reach a desired frequency value, which can be controlled by the measuring or comparing means, and in order to generate the microengraving operations on these zones for the balancing of the sprung balance assembly in relation to its main axis of inertia in relation to a desired value, which can be controlled by the measuring or comparing means.

In the second alternative the control means are programmed in order to create loss by modifying the rigidity of the spiral spring without modifying its crystalline structure or its thermal coefficient by microengraving conducted under the action of at least one pulse sequence of at least one pico-laser to thin out at least one coil of the spiral spring and/or the twisted part of a terminal end when said spiral spring has one, still for the balancing of the sprung balance assembly in relation to its main axis of inertia in relation to a desired value, which can be controlled by the measuring or comparing means.

It is thus possible to create loss:

by modifying the rigidity of the spiral spring by thinning out at least one coil of the spiral part of the spiral spring, and/or by modifying the rigidity of the spiral spring by thinning out at least the twisted part of a terminal end when said spiral spring has one.

In a first embodiment at least two beams with the same characteristics are directed simultaneously in two such zones distant from one another and radially distant by the same value from the balance axis, either by dividing the beam of a single pico-laser or by synchronising two pico-lasers receiving the same instructions from the control means. The division of the beam can be achieved by an optical element such as a mirror, semi-reflective prism or the like. Preferably, a pulse sequence is generated on each of these zones that is identical to that of the other zone. If this is not possible because of slightly different characteristics of two lasers, for example, it is ensured that the micromachining operations are changed around half way through to balance the material actually removed on both sides.

Of course, while the example given here is with two pico-lasers, it is possible to use more laser sources. However, the space requirement and access to the work zone often make the use of more than two beams on the same assembly impractical.

In a particular embodiment at least two beams with the same characteristics are directed simultaneously in at least two such zones of the rim or components carried by the balance, either by dividing the beam of a single pico-laser or by synchronising several pico-lasers receiving the same instructions from the control means. These zones are distant from one another and preferably radially distant by the same value from the balance axis. A pulse sequence is generated on each of these zones that is identical to that of the other zone. More generally, scanning operations can be conducted with any symmetry of the n-th order.

The rapidity of response of the current automatic controls makes it possible with a single laser or pico-laser to orient its beam onto the zones of the component that are distant from one another, in particular on either side of its main axis of inertia, which when the work area is open allows micromachining to proceed in every respect, and in particular allows machining operations to be conducted that are still symmetric in relation to the main axis of inertia so as not to create unbalance. It is thus possible to work in a pendulum fashion on either side of the same piece taking some tenths of a second to pass from one micromachining zone to the other.

It is also possible in the case of correcting gain or loss of an oscillator to correct half of this gain or this loss straightaway by scanning with the laser or pico-laser a single zone of the balance that is highly localised on one side, thus creating an unbalance that is then eliminated by conducting a symmetric removal of material on the other side of the balance in the same manner. In this method of micromachining there is a saving of several tens of seconds per day for the intermediate paths of the beam, which are minimised, and this is particularly important if the value to be corrected is large. In the case of micromachining on an oscillating assembly work is preferably conducted on a number of complete cycles to minimise the unbalance.

Naturally, it is also possible to divide the beam discharged from a single laser or pico-laser with a set of prisms or mirrors in order to obtain two beams striking the component in two different zones. This division is then advantageously performed symmetrically to arrive at the same result. In fact, the use or one of more lasers or pico-lasers depends on the space in the work area and on the accessibility to the zones to be micromachined, which can be restricted when the component is integrated into a mounted assembly, and it can then be easier to use several lasers or pico-lasers simultaneously in symmetry than to divide the beam of a single laser or pico-laser along a complicated route.

For good utilisation of the invention measuring and comparing means are used in order to measure or compare the dynamic inertia of the compound around an axis of inertia of this component, in particular around its main axis of inertia. Its pivot axis is preferably chosen to be merged with this main axis of inertia. These measuring and comparing means can also be used to compare the component to a theoretical model.

These measuring or comparing means are preferably used in real time simultaneously with the microengraving conducted by the laser or pico-laser and/or with an addition of material and/or with a displacement of material.

Advantageously, the micromachining is preferably conducted on the component with the latter assembled in an assembly formed from several elements, e.g. a module or a timepiece movement.

In particular, the micromachining is conducted on the component with the latter assembled in a spring balance of a timepiece movement or also this micromachining is conducted on the component, which can be a spring balance in particular, with the latter assembled in a timepiece movement.

The invention is particularly effective for different timepieces, whether movable or not, which can include, as non-restrictive examples as the invention is universal: balance, spiral, spring balance, cannon pinion friction or others.

Thus, in a particular configuration a method for adjusting frequency is used on a timepiece spiral, the external coil of which is extended by a second end part for its connection to a balance spring stud. According to this method loss is created by modifying the rigidity of this spiral by thinning out at least the first spiral part or the second end part without modifying its crystalline structure or its thermal coefficient, by a microengraving operation conducted under the action of at least one pulse sequence of at least one laser or pico-laser. In particular, the twisted part of the second end part, when this has such a twisted part, is micromachined. It is also possible to modify, in the same way, the rigidity of the spiral by thinning out the first spiral part at the level of several of its coils. Naturally, the thinning out of the first spiral part and the second spiral part can also be performed.

If necessary, at least one mask can be positioned to protect certain surfaces of the component or the assembled assembly, and naturally these surfaces can also be taken by the control means as no-go surfaces for the paths of the beam of the laser or pico-laser.

The invention also relates to a device for implementing the method according to the invention comprising at least one laser or pico-laser source, control means for this source also arranged to control the movement of the beam discharged from this source or to control the movement of this source itself, measuring or comparing means, in particular for inertia and/or oscillation frequency, which are interfaced with these control means, and gripping and supporting means for a component or an assembly to be micromachined. It also preferably comprises driving means for pivoting this component or this assembly, which are interfaced with these control means. Advantageously, it also comprises means for dividing the beam discharged from the laser or pico-laser, and the control means are then arranged to control each of the beams resulting from the division, and/or it comprises several laser or pico-laser sources, wherein the control means are then arranged to control each of their beams.

The choice of micromachining strategies, to return to the terminology specific to the field of high-speed multiaxial milling, at the level of the control in the space of the beam of the laser or pico-laser thus enables an adjustment of inertia and/or a balancing of quality to be conducted in a very efficient manner with unbalances of less than 2 micrograms×centimeter obtained to conduct the micromachining treatment in a minimal time ranging from a few seconds to some tens of seconds. For example, the treatment time to perform a correction of 50 seconds per day does not exceed 10 seconds. The invention also allows the micromachining to be conducted according to a particular and recognisable appearance. The latter advantage is useful in the fight against counterfeiting.

The measuring and comparing means to be used are not complex and are classic devices. In the case of a balance the measurements essentially concern the phase of the balance, the amplitude, speed and the position of the rim combined with the dynamic measurements and comparisons of inertia and frequency of the oscillator.

The fact of being able to conduct the ablation during the operation of a spring balance allows immediate feedback of the ablation result by measurement of the frequency.

The choice of a removal of material with a static component is inexpensive. A symmetry of the removals of material must be assured for turning components and therefore the control means must control symmetric scanning zones and verify that the lengths of the grooves are equivalent.

The adjustment of the frequency of an oscillator is thus made possible by removing material both at the level of the balance, its rim, a stud or an inertia block or a screw thereof, or also of any element taking part in the inertia such as the spiral spring so long as the materials of these components lend themselves to a sublimation by a laser or preferably a pico-laser. Adjustments of some seconds per day or more can be conducted easily and rapidly. Moreover, this is the reason why the use of pico-lasers is preferred rather than femto-lasers or atto-lasers, which are also usable, but where the pulse is even shorter by a factor of 1000 each time, but with which the removal of material is poor and is more difficult to render compatible with an industrial adjustment. Conversely, in terms of cleanliness the use of a laboratory laser or a nano-laser is less advantageous than that of a pico-laser. However, since the removal of material by a nano-laser is much superior to that of a pico-laser, its use can be of interest industrially provided that sprays are collected by protective means, screens or rotating blades or even by magnets combined with a gaseous flux for evacuating the lightest gases and waste materials.

In the majority of cases in watchmaking operations such as the adjustment of frequency or control of inertia of a spring balance, two micromachining passes have proved sufficient and are conducted in a few seconds or tens of seconds at maximum.

A variant of implementation of the method according to the invention consists of not conducting an ablation, but conversely conducting an application of material, either alone or in combination with an ablation and/or with a displacement of material. It is understood that it is thus equally possible to then conduct adjustments or controls of oscillation frequency, inertia or balancing.

Such an application of material, which can naturally be combined with an ablation of material, in particular in an iterative process where the optimum adjustment is sought, can be conducted by lase or pico-laser or the like or also by means of material spraying means such as a spray head or by "jetting" a heavy product that is able to attach to the movable part in question. In a well controlled manner, this spraying can in particular be an ink spray or a spray of another material for rapid fixing by a print head or the like. The deposition rate is very high and the operating time is in the same order of magnitude as the laser scanning discussed above for the micro-removal of material.

Other methods of applying material are conceivable such as contact bumbs or treatments such as directional PVD or LEPVD, welding, brazing, reflow, ion implantations or the like.

A device arranged for an application of material that is not shown in the figures can comprise in particular triaxial control means to allow any spatial orientation of at least one spraying unit for each of the zones of the movable part where the material is to be added.

The programming of the control means enables gain to be created on a balance by repeating microengraving operations over this or these zones in order to reach a desired frequency value, which can be controlled by the measuring or comparing means, and in order to generate these microengraving operations on these zones for the balancing of the balance in relation to its main axis of inertia in relation to a desired value, which can be controlled by the measuring or comparing means.

It is understood that in contrast the addition of material allows loss to be created on the balance. As explained above, in the case of a spring balance a removal of material on the coil also allows loss to be created on the assembly.

It is thus possible on a spring balance to create gain or loss, as desired, either by removal or addition of material on the balance respectively or, conversely, by addition or removal of material on the coil.

In the case of a combined use of several beams, it is also conceivable to cause the distribution of power to be varied between the different beams to act on equalling unbalance under the control of the control means.

In a particular practical embodiment of the invention in order to minimise the treatment time, the ablation point of the laser or pico-laser remains fixed or possibly moves in a restricted zone. As a result, it is possible to conduct the ablation in uninterrupted fashion, which minimises the treatment time.

However, in general, a not inconsiderable unbalance is created. However, it will be shown below that it is possible to cancel out this unbalance, provided that the spring balance has a well chosen amplitude. This strategy is therefore characterised by two elements:
(a) continuous ablation in a zone with a size in the order of the annular width of the balance rim or, as applicable, in a zone of a coil or a terminal curve of the spiral spring, and
(b) the sprung balance assembly having a well chosen amplitude to minimise the unbalance.

In another particular embodiment the beam of a single laser or pico-laser is displaced from such a zone to another zone in symmetry on either side of a plane passing through the balance axis, and this plane is preferably chosen at equal distance from extreme amplitudes of the pivoting path of the sprung balance assembly. Preferably, such a pulse sequence identical to that of another zone preceding it or that directly following in the work sequence of the laser or pico-laser is generated alternately on each of these zones. This plane is preferably chosen at equal distance from extreme amplitudes of the pivoting path of the balance. In a particular mode these zones can be chosen in axial symmetry in relation to the pivot axis of the balance or the sprung balance assembly, as applicable.

It is understood that in a mode like the other the displacement of the beam in relation to the zone is a relative displacement: it is equally possible to cause the beam to move, or indeed the source, the sprung balance assembly, or preferably the beam and the sprung balance assembly at the same time.

In the mode where a single laser or pico-laser is used, amplitude stabilising means are advantageously used to maintain the pivoting movement of the component or the sprung balance assembly in an oscillation at constant amplitude during the course of each pulse sequence. This amplitude is stabilised at an angle with a value of 137° or 316.5°. It is also possible to use synchronising means to synchronise the movement of the beam of the pico-laser with the pivoting movement of the sprung balance assembly during the course of each pulse sequence. There again the amplitude is stabilised at an angle with a value of 137° or 316.5°.

For better efficiency, it is preferred that this at least one zone is defined to be formed solely from surfaces formed by metal surfaces, on the one hand, at the level of the balance or components or inertia blocks or studs or adjusting screws that this balance carries or, on the other hand, at the level of a spiral part or an end curve of the spiral spring. In the absence of such metal surfaces that allow the gain or loss to be corrected if necessary, a second process is implemented, through which the adjustment of the unbalance is adjusted to recreate a correction ability, as applicable, on the balance and/or on the spiral spring. This second process can be an iterative second process and through this the first iterative process is resumed until the desired oscillation frequency is obtained within its tolerance.

In a particular variant embodiment of the method the control means are automatically controlled by the measuring or comparing means.

Before starting the process an initial static and dynamic balancing is conducted on the sprung balance assembly to cause its main axis of inertia to coincide with the balance axis and to reach a desired value of inertia within a given tolerance.

The ablation strategy for a moving sprung balance assembly, i.e. during its pivoting movement around the balance axis, is clarified by the following calculation.

By the implementation of a novel method, the invention proposes to conduct the adjustment of frequency of this sprung balance assembly, but also to enable its adjustment of inertia and balancing in order to cause this pivot axis of the balance to coincide with its main axis of inertia.

The present invention is developed to be conducted equally on a single balance, an assembled spring balance as well as a spring balance that is integrated and mounted in a timepiece movement.

The treatment time and the unbalance created are optimised as a result of this strategy.

The method of amplitude stabilisation explained below applies equally to a isolated movable component such as a balance and to an assembly such as a sprung balance assembly or other.

As will be explained in detail below, this amplitude is thus preferably stabilised at an angle with a value of 137° or 316.5°.

Different methods are usable to stabilise the amplitude, whether alone or in combination: choosing a particular state of winding of the spring barrel, automatic closed-loop control of amplitude by controlling an external torque source on the arbor or on one of the movable parts of the movement such as the second or minute hand or other, use of an external stabilisation source such as freely oscillating flow of air, removed anchor or other.

In the case where a single laser or pico-laser is used, it is also possible to use synchronisation means to synchronise the movement of at least one beam discharged from the laser or pico-laser with the pivoting movement of the sprung balance assembly during the course of said pulse sequence.

For synchronisation it is a matter of estimating the oscillation phase of the balance or of the sprung balance assembly, as applicable, which is possible using different methods, either alone or in combination: acoustic method by capturing noise produced by the escapement by microphone, optical method by detecting the arms of the balance and the roughness of the arms to determine the position, speed and acceleration of the rim, or any other method.

It will now be described how the amplitudes that enable the unbalance to be minimised, or indeed cancelled, are determined.

Figure 1:
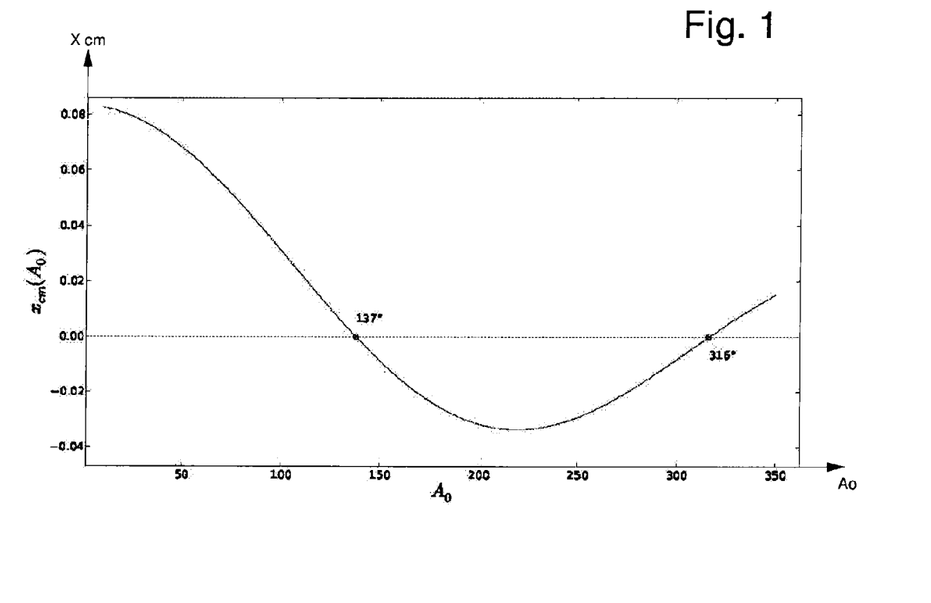
FIG. 1 is a graph with on the ordinate side the algebraic value of the position of the centre of mass of the material removed during a micromachining operation by ablation using a laser or pico-beam as a function of the amplitude of the angular position of a timepiece balance.

Since the ablation point does not change while the sprung balance assembly is moving, the removal of material is distributed along the rim and not necessarily over the entire perimeter, depending on the amplitude of the sprung balance assembly, or is distributed along a coil. For simplification, the elements that the rim is likely to carry such as inertia blocks, studs, balancing and/or adjusting screws are put in the same category as said rim. Similarly, the related elements that a spiral spring can comprise such as end curve, collet or other, are put in the same category as a coil of said spiral spring. Moreover, since the ablation is preferably conducted at a constant shot frequency, while the speed of the sprung balance assembly varies, the quantity of material removed at an angular position θ also varies. Our objective is to find an oscillation amplitude of the sprung balance assembly that cancels out the unbalance or, as an equivalent, leads to a centre of mass of the material removed located at the centre of sprung balance assembly.

The position Xcm of the centre of mass of the material removed is given by:

$$\vec{x}_{cm} = \frac{\int \vec{x} dm}{\int dm},$$

wherein the integration occurs along the rim. Let us call f the function of θ, which gives the distribution of material removed per unit length (along the rim or the coil, as applicable). To ensure the unbalance created by the removed material is zero, the following is therefore necessary:

$$\int \vec{x} \, dm = \int \vec{x} f(\theta) d\theta = 0$$

The fact that only magnitudes per unit length are considered results from being able to ignore the width of the work zone of the laser or pico-laser in relation to the size of the sprung balance assembly as well as the component of the unbalance according to the pivot axis, despite the fact that f varies as a function of θ results in an inconstant ablation depth.

Let us consider for the moment only the first quarter of a single period. The quantity dm of material removed over an interval dθ around θ has been for a certain time dt, and one also has $$dm = k dt,$$

where k is the rate of removal of the material. Since the shot frequency of the laser or pico-laser is preferably constant and very high in relation to the oscillation frequency of the balance, k can be considered to be constant. Therefore $$k dt = f(\theta) d\theta.$$

But θ=A(t), where A is the function that gives the angular position of the balance at time t, and therefore dθ=Ȧ(t)dt, which indicates that $$f(\theta) = \frac{k}{\dot{A}(t)} = \frac{k}{\dot{A}(A^{-1}(\theta))}$$

In other words, the distribution of removed material at position θ of the rim is inversely proportional to the speed of the sprung balance assembly when its angular extension equals θ.

For a treatment time in the order of a second or a tenth of a second, the oscillation of the sprung balance assembly is properly described as a harmonic evolution, $$A(t) = A_t \sin(\omega t).$$

Thus, clarifying the last expression for f, it is found that $$f(\theta) = \frac{k}{A_0 \omega \cos(\arcsin(\theta/A_0))}$$

which is ultimately expressed as $$f(\theta) = \frac{k}{A_0 \omega \sqrt{1 - (\theta/A_0)^2}}$$

This expression has no meaning when θ>$A_0$, but it is agreed that for values of θ higher than $A_0$, f equals zero, which is normal since the laser or pico-laser does not reach these positions.

To arrive at this result, we have restricted ourselves to a quarter oscillation of the sprung balance assembly.

The final expression for f corresponding to a complete period is obtained from that applicable to the quarter period by symmetry. However, it is not really necessary to actually include these. Moreover, any extra complete period does not increase the unbalance.

To understand why it is possible to limit ourselves to a first quarter period for our calculation, let us call Ox the axis that joins the axis of the balance at the work point of the laser or pico-laser, and Oy the axis perpendicular to Ox. Adding the second period half to f does not change the coordinate Xcm of the centre of mass of the material removed and it is made sure that the coordinate y will be zero by symmetry. Adding the second quarter period to f only causes f to be multiplied by two, which does not change the condition assuring Xcm=0 in any way. Consequently, Xcm is studied as a function of f defined by equation (1). Thus:

$$x_{cm} = \int_0^x \frac{\cos(\theta) k}{A_0 \omega \sqrt{1 - (\theta/A_0)^2}} d \quad (2)$$

Finally, the values to determine the values of $A_0$ which cancels out Xcm are to be determined. As there is no primitive integral that allows a closed form solution to be obtained for the integral in question, the zeros of the right member of equation (2) above are obtained by numerical integration in an approximate manner.

A graph of the right member of equation (2) as a function of $A_0$ is given in FIG. 1, where on the ordinate side the algebraic value of the position of the centre of mass Xcm of the material removed is shown as a function of the amplitude $A_0$ of the angular position.

It is evident that for values of the amplitude between 0° and 360° there exist two amplitudes that give a zero unbalance, i.e. $A_0$=137° and $A_0$=316°.

A tolerance of more or less than 2.5° per microgram× centimeter unbalance is preferably applied to these values, i.e. more or less than 5° for an unbalance of 2 micrograms× centimeter, for example.

In practice, it is not necessary for the laser or pico-laser to remain absolutely immobile. For example, it can be caused to move radially back and forth, while remaining on the rim or on the coil, as applicable. It is also possible to cause it to follow different shapes such as e.g. a circle, an eight, a polygon. However, so long as the zone scanned by the laser or pico-laser has a typical extension in the order of the thickness of the rim or the width of the coil, the above theoretical model remains a good approximation and its conclusions remain valid.

We have not considered the effect of a phase shift in the above reasoning. Its contribution to the unbalance is, however, negligible, since each complete oscillation of the sprung balance assembly produces a zero unbalance and therefore the unbalance associated with a phase shift increases at most to the maximum unbalance created during a single incomplete period.

The defined calculation presented above was conducted when the evolution of the movement of the sprung balance assembly has an amplitude lower than 360°. However, there is nothing to compel us to limit ourselves to this case. For example, if a balance or a sprung balance assembly should have an amplitude higher than 360°, the function $A^{-1}(\theta)$ would then have several solutions, even over a quarter period, which complicates the writing of expressions without, however, changing the reasoning underlying them.

Figure 2:
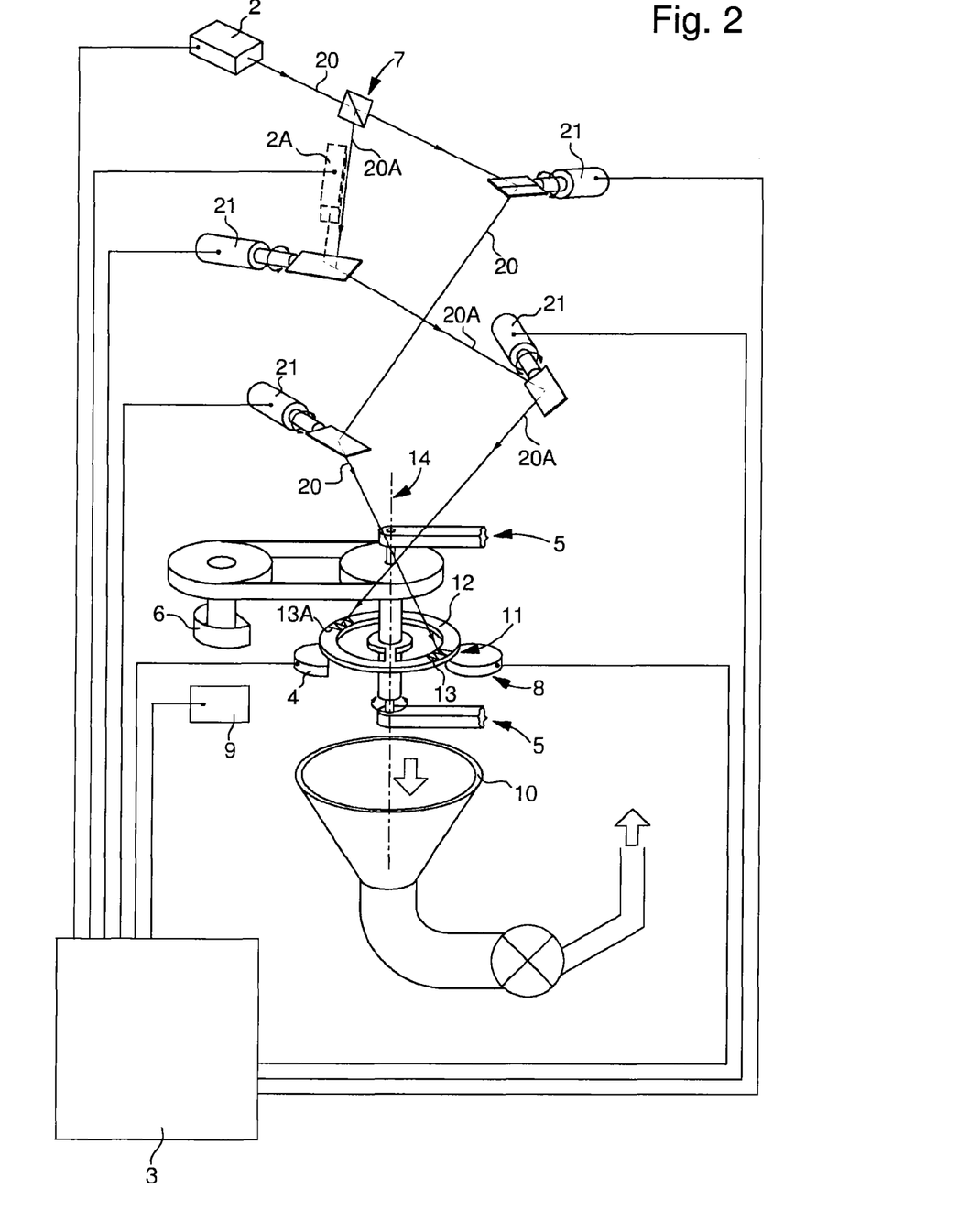
FIG. 2 schematically shows a device for implementing the invention.

The invention also relates to a device 1 for implementing the method, as visible in FIG. 2, that comprises at least one laser or pico-laser source 2 and control means 3 for this source arranged to generate, sequence, interrupt at least one pulse sequence of the laser or pico-laser 2. These control means 3 are also arranged to control the movements of at least one beam 20 discharged from the laser or pico-laser 2 or the movement of this source 2 itself. The device 1 also comprises measuring and comparing means 4 interfaced or connected to these control means 3, and gripping and supporting means 5 for a balance 11 or a sprung balance assembly 11 to be micromachined or similar. For simplification, the simplified FIGS. 1 and 3 to 5 only show the balance 11, the rim 12 and the pivot axis 14 of this sprung balance assembly 11.

This device 1 preferably further comprises driving means 6 for pivoting a sprung balance assembly 11 to be micromachined, which are interfaced with these control means 3. In another variant, it is also possible to implement the invention with a freely oscillating balance or a sprung balance assembly and the device 1 thus comprises pulsing means for its initial oscillation.

In a first embodiment, as evident from FIG. 2, the device 1 comprises means 7 for dividing the beam discharged from the laser or pico-laser 2. The control means 3 are arranged to control each of the beams 20, 20A formed by the division. Alternatively or additionally, as evident from FIG. 3, the device 1 can also comprise several laser or pico-laser sources 2, 2A, and the control means 3 are then arranged to direct each of their beams 20, 20A towards the micromachining zones 13, 13A defined by the control means 3.

FIG. 2 gives an example of control of beams 20 and 20A formed by the division and having a spatial trajectory defined by the orientation of motor-driven mirrors or prisms 21, preferably with one or two degrees of freedom of pivoting movement, which are controlled by the control means 3. Such mirrors or prisms 21 can also be incorporated into a galvanometer or can be configured in any way known in the general field of power lasers.

Advantageously, the device 1 comprises amplitude stabilising means 8 to maintain the pivoting movement of the sprung balance assembly 11 to be micromachined with an oscillation of constant amplitude.

Advantageously, the device 1 comprises synchronising means 9 that are preferably disengageable for synchronising the movement of at least one beam 20 discharged from the laser or pico-laser 2 with the pivoting means of the sprung balance assembly 11 during the course of each pulse sequence.

Advantageously, to channel any contamination and also to leave the work area perfectly clean, the device 1 preferably comprises evacuation means 10 for gases and/or waste materials associated with the sublimation, wherein these evacuation means preferably operate by pressure difference. These evacuation means have a dual function: removing the gases caused by sublimation from the work area and also protecting the operators in the case where these gases might be toxic.

In a variant of the invention calling for the use of inertia blocks, these are advantageously designed to enable an adjustment of operation, in particular as part of after-sales service, but also as part of the initial factory adjustment.

A first variant of configuration is the use of inertia blocks that are identical but positioned on different diameters.

A second variant of configuration is use of inertia blocks that are different, in particular of different thicknesses, but are positioned on the same diameter. The difference in thickness can result from a prefabrication or also ablation of material on the thickness of the inertia block by laser or pico-laser.

Naturally, the combination of these two variants of inertia blocks is equally possible.

Advantageously, these inertia blocks are configured in a form that allows the use of standard tools in after-sales service, in particular "Bergeon" type tools or similar.

A variant of the invention allows prevention or at least minimisation of the removal or addition of material in order to conduct the adjustment or control of oscillation frequency and/or inertia and/or balancing of a movable component of a timepiece movement or a timepiece balance that comprises a peripheral rim and is able to pivot around a balance axis, or a sprung balance assembly. This variant concerns performing a displacement of material within the movable part by localised melting followed by a displacement of the melting zone, followed by a solidification cooling operation. This allows the removal or addition of material to be minimised or indeed prevented.

The displacement of melting material can be conducted by gravity or under the action of centrifugal force during the adjustment of operation, or also in an advantageous variant under the effect of an attraction force, in particular a magnetic and/or electrostatic attraction force, if the material allows this.

The displacement of material can also be associated with internal stresses created or relaxed during a thermal treatment.

The displacement of material can also be conducted by bending a deformable zone provided for this, such as a lug or pin or similar.

The displacement of material can also be conducted by spreading material: the choice of certain materials that spread easily such as indium, or certain plastic materials that can greatly facilitate such a displacement of material. This spreading operation can be conducted with a roller, a chisel, a hook or similar by pushing and/or pulling the material upon stoppage and/or during pivoting.

This localised melting can be conducted by laser, nano-laser or pico-laser technology, as explained above, or by plasma or similar.

The design of the movable part can be advantageously oriented to facilitate the ablation, deposition or displacement of material.

Thus, the invention also relates to a spring balance timepiece assembly without index-assembly arranged to implement the method described here for adjusting its oscillation frequency, characterised in that it comprises either a plurality of inertia blocks made in a form that allows standard tools to be used in after-sales service and configured to be either identical and positioned on the same diameter or on different diameters, or different and positioned on the same diameter or on different diameters, or one or more closed internal chambers specifically for the displacing or repositioning melting material, or a surface layer or sacrificial parts, or pre-stress zones that can be relaxed under application of an external force, or zones capable of occupying different physical states under the effect of a thermal treatment, or electrified and/or magnetised zones, or polymetallic zones with variable stresses distribution.

In particular, in an advantageous configuration the movable part comprises a surface layer, which can be different in nature from its core structure and which has physical properties that make these operations of ablation, deposition, transformation or deformation easier. The structure of this surface layer, which can be a sacrificial layer, is advantageously chosen to allow the use of simpler and more rapid methods to conduct the desired operations. In the case of laser ablation in particular an appropriate choice of surface layer can allow a nano- or a femto-laser to be used in place of the pico-laser most particularly recommended for direct action on the material of the structure of the movable part. This surface layer additionally allows a particular appearance to be given to the movable component in question.

In a particular configuration the movable part comprises one or more internal chambers, possibly communicating or not, in which is conducted a melting of material, a displacement of this melting material, then a solidification. The material caused to melt may very well be of a different nature from the material of the structure of the movable part, e.g. the chamber can contain a product that is meltable at a lower melting temperature than that of the structure in which the chamber is arranged, e.g. a balance made of brass can comprise a chamber or a channel where melting tin is deposited at the manufacturing stage, and the remelting of this tin and its centrifugal or centripetal displacement allows the inertia of the movable part to be modified.

The creation of closed chambers within the movable part, e.g. within a balance, enables an invisible adjustment and allows an anti-counterfeiting indicator to be formed.

Another variant consists of deforming the surface of the movable part by a mechanical process, for example, such as knurling, grooving, embossing, punching, burr or crater creation or the like, in order to locally modify its inertia.

The geometry of the movable part can be designed for flattening during a heating operation or mechanical action, e.g. the rim of a balance can have bumps that are intended to be flattened by melting or by application of a force.

Another variant consists of designing the movable part, on which a control or adjustment of operation is desired and which is provided with removal and/or pliable sacrificial parts. This arrangement allows the adjustment of inertia as well as adjustment of the torque on a spiral, and also allows a relaxation of residual stresses.

In particular, certain zones of the movable part can be set aside to be subjected to the operations of ablation, deposition of material, transformation or deformation, e.g. at the level of the peripheral lugs or the like.

More particularly, in the case of a balance or a spring balance it is advantageous for reasons of accessibility to conduct micromachining, deposition or displacement of material on the edge of the rim as well as on the two opposite faces thereof.

Advantageously, a localised change of physical state of the material forming the component or of at least one component of the assembly is performed to modify its inertia by locally modifying its geometry and/or its density.

The design of the movable part can also integrate one or more pre-stress zones that can be relaxed under the action of an external force. For example, it is possible to create zones with high surface tension that can be relaxed during adjustment, thus creating a slightly modified geometry.

In a similar manner, the choice of a shape memory material such as "Nitinol" or similar for the formation of the movable part allows a geometry to be obtained that returns to or assumes a predefined shape during the adjustment of operation. The transition threshold corresponds to a transition temperature, which can be obtained by a well controlled local heating.

Use of the physical properties of certain materials such as ceramics, semiconductors, polymers, alloys obtained by the "LIGA" process, quartz, charged materials, amorphous metals also allows the use of different geometries corresponding to different physical states that these materials can assume. For example, the transformation of a balance made from amorphous material during passage of its glass transition temperature results in a localised variation in density, which produces the desired effect.

Such a local change in characteristics can result, for certain materials, in a core treatment or a phase change or a change in crystallographic structure.

The formation of a movable part in the form of an assembly of several materials and/or metals having different physical properties, e.g. like a bimetal, also allows the distributions of stresses to be modified and an adjustment of inertia to be conducted. In particular, in the case of a balance the formation of a bimetallic or polymetallic rim enables this aim to be achieved.

The application of the method according to the invention to control or adjustment operations reveals an extension in a modification of surface characteristics of the movable part that can in certain cases be obtained by using the same means: some internal zones of the movable part are treated, e.g. electrified or magnetised, then covered with a surface coating. A local action on this surface coating thus allows all or part of the treated zones to be revealed, which can enable a control or adjustment operation to be improved by an attracting or repelling force with another element, and this will enable the desired control or adjustment to be achieved more easily.

The implementation of the invention enables controls and adjustments to be facilitated.

It can also allow the removal of certain usual arrangements such as the twisting of the coil, the usual purpose of which is to minimise the variation in operation during movement by fixing the counting point. In fact, the concept of the invention allows the variation in operation to be minimised.

The invention claimed is:

1. A method for adjusting an oscillating frequency of a timepiece sprung balance assembly, said sprung balance assembly including at least one balance that includes a peripheral rim and including at least one spiral spring, said at least one balance and said at least one spring being attached to one another at a collet, wherein said sprung balance assembly is pivotable around a balance axis in a timepiece movement, and the method is for adjusting inertia and balancing said at least one balance of said timepiece sprung balance assembly, the method comprising:

conducting a removal or a displacement of material on said sprung balance assembly by using at least one laser source to conduct a micromachining or a microfusion operation on the material of said balance under an effect of at least one pulse sequence of said laser source; and controlling said at least one pulse sequence by a controller configured to generate, sequence, and interrupt any pulse of said at least one laser source, wherein said controller is also configured to control directional movement of at least one beam discharged from said laser source, wherein said controller is automatically controlled by a measuring or comparing mechanism, and wherein said removal or displacement of the material on said sprung balance assembly is conducted with said sprung balance assembly assembled in the timepiece movement.

2. The method according to claim 1, wherein said controller is programmed to define at least one particular zone of a surface of said sprung balance assembly, at which the material is to be removed or displaced, and said controller is programmed to generate at least one pulse sequence at a high average frequency, in a range of between 100 kHz and 500 kHz, of said laser source to generate over said zone at least one line of successive impacts of a beam emitted by said at least one laser source.

3. The method according to claim 2, wherein said sprung balance assembly or a direction of the beam of said laser source is moving during said at least one pulse sequence.

4. The method according to claim 2, wherein both said sprung balance assembly and a direction of the beam of said laser source are moving during said at least one pulse sequence.

5. The method according to claim 2, wherein said sprung balance assembly is caused to pivot around a main axis of inertia of said sprung balance assembly during said at least one pulse sequence of said laser source, and wherein said measuring or comparing mechanism is used for purposes of measuring or comparing dynamic inertia of said sprung balance assembly around the main axis of inertia of said sprung balance assembly.

6. The method according to claim 5, wherein a single laser source is used, and an amplitude stabilizing mechanism is used to maintain a pivoting movement of said sprung balance assembly in an oscillation at constant amplitude during a course of each pulse sequence.

7. The method according to claim 6, wherein said amplitude is stabilized at an angle with a value of 137° or 316.5°.

8. The method according to claim 6, wherein a single laser source is used, and wherein a synchronizing mechanism is used to synchronize movement of at least one beam discharged from said laser source with a pivoting movement of the amplitude stabilizing mechanism to maintain the pivoting movement of said sprung balance assembly during the course of each pulse sequence emitted by said single laser source.

9. The method according to claim 2, wherein at least two laser sources are used, beam movements of which are symmetric either in relation to a plane passing through a main axis of inertia of said sprung balance assembly or in relation to the main axis of inertia of said sprung balance assembly.

10. The method according to claim 1, wherein the displacement of the material within the sprung balance assembly is conducted either by localized melting followed by a displacement of a melting zone followed by solidification cooling, or by creating or relaxing internal stresses during a thermal treatment or under an effect of an external force, or by bending a deformable zone or a lug or a pin, or by spreading of the material.

11. The method according to claim 10, wherein the displacement of the material is conducted by localized melting followed by a displacement of the melting zone followed by solidification cooling, wherein the displacement of the material that is melted is conducted either by gravity, or under action of centrifugal force during adjustment of operation, or under an effect of a magnetic and/or electrostatic attraction force.

12. The method according to claim 1, wherein a localized physical change of state of the material forming a component of said sprung balance assembly is performed to modify inertia of the component by local modification of geometry of the component or density of the component.

13. The method according to claim 1, wherein at least one pico-laser is chosen as said laser source to perform said removal of material by microengraving under an effect of at least one pulse of said pico-laser to directly transform solid material of said sprung balance assembly into a gaseous flux by sublimation, and a pressure difference is established on either side of said sprung balance assembly during treatment of the sprung balance assembly by said at least one pico-laser to evacuate gases and/or waste materials associated with said sublimation.

14. The method according to claim 1, wherein said method further comprises a first process comprising:

evaluating a gain or loss of said sprung balance assembly in relation to a desired oscillation frequency;

programming said controller to define at least one particular zone, at which the material must be removed or displaced, where in a first alternative in a case of a need to create the gain, said zone is defined at said rim of said at least one balance or components or inertia blocks or studs or screws carried by said at least one balance, or where in a second alternative in a case of a need to create the loss, said zone is defined at the at least one coil of said at least one spiral spring; and programming said controller to generate the gain by a reduction of inertia by removing material on said at least one balance, or to generate the gain by displacing material at said at least one balance or said at least one spiral spring, or to generate the loss by modifying rigidity of said at least one spiral spring by removing material on said at least one spiral spring, or to generate the loss by displacing material at said at least one balance or said at least one spiral spring.

15. The method according to claim 14, wherein said controller is programmed to create the gain on said at least one balance by repeating microengraving operations on said at least one particular zone to reach a desired frequency value, which is controllable by said measuring or comparing mechanism, and to generate said microengraving operations on said at least one particular zone for the balancing of said sprung balance assembly in relation to a main axis of inertia of the sprung balance assembly in relation to a desired value, which is controllable by said measuring or comparing mechanism, and said controller is programmed to create the loss by modifying the rigidity of said at least one spiral spring without modifying a crystalline structure of the at least one spiral spring or a thermal coefficient of the at least one spiral spring by microengraving conducted under action of at least one pulse sequence of said at least one laser source to thin out at least one coil of said at least one spiral spring or a twisted part of a terminal end when said at least one spiral spring has one.

16. The method according to claim 15, wherein said at least one particular zone is defined to be formed solely from surfaces formed by metal surfaces at a level of said at least one balance or components or inertia blocks or studs or adjusting screws that this at least one balance carries, or at a level of a spiral part or an end curve of the at least one spiral spring.

17. The method according to claim 14, wherein an initial static and dynamic balancing of said sprung balance assembly is conducted to cause a main axis of inertia of the sprung balance assembly to coincide with said balance axis and to reach a desired value of inertia within a given tolerance.

18. The method according to claim 1, wherein the method is implemented to adjust an oscillation frequency of a timepiece sprung balance assembly without an index assembly, the timepiece sprung balance assembly without the index assembly comprising:
    either one or more closed internal chambers specifically for displacement or repositioning of material that is melted, or a surface layer or sacrificial parts, or prestress zones that are relaxable under application of an external force, or zones occupiable in different physical states under an effect of a thermal treatment, or electrified and/or magnetized zones, or polymetallic zones with variable stress distribution.

19. A device for implementing the method according to claim 1, wherein said device comprises:
    at least one pico-laser source forming said laser source,
    the controller for said laser source arranged to generate, sequence, and interrupt at least one pulse sequence of said pico-laser, wherein said controller is also configured to control directional movement of at least one beam discharged from said pico-laser,
    the measuring and comparing mechanism interfaced with said controller,
    a gripping and supporting mechanism for a sprung balance assembly to be micromachined,
    a driving mechanism to pivot said sprung balance assembly, which is interfaced with said controller,
    an amplitude stabilizing mechanism to maintain a pivoting movement of said sprung balance assembly in an oscillation of constant amplitude, and
    a mechanism to evacuate gases and waste materials associated with a sublimation of the material by a pressure difference.

20. The device according to the claim 19, wherein said device further comprises a synchronizing mechanism to synchronize movement of at least one beam discharged from said pico-laser with a pivoting movement of the amplitude stabilizing mechanism to maintain the pivoting movement of said sprung balance assembly during a course of each pulse sequence emitted by said at least one pico-laser source.

21. The device according to claim 19, wherein
    said device further comprises a mechanism to divide the beam discharged from said pico-laser, wherein said controller is configured to control each of beams resulting from the division, or wherein
    said device further comprises plural pico-laser sources, wherein said controller is then configured to control each of beams of said plural pico-laser sources.

22. A method for adjusting an oscillating frequency of a timepiece sprung balance assembly, said sprung balance assembly including at least one balance that includes a peripheral rim and including at least one spiral spring, said at least one balance and said at least one spring being attached to one another at a collet, wherein said sprung balance assembly is pivotable around a balance axis in a timepiece movement, and the method is for adjusting inertia and balancing said at least one balance of said timepiece sprung balance assembly, the method comprising:
    conducting a removal or a displacement of material on said sprung balance assembly by using at least one laser source to conduct a micromachining or a microfusion operation on the material of said balance under an effect of at least one pulse sequence of said laser source; and
    controlling said at least one pulse sequence by a controller configured to generate, sequence, and interrupt any pulse of said at least one laser source, wherein said controller is also configured to control movements of at least one beam discharged from said laser source, wherein said controller is automatically controlled by a measuring or comparing mechanism, wherein
    said removal or displacement of the material on said sprung balance assembly is conducted with said sprung balance assembly assembled in the timepiece movement, and wherein
    both said sprung balance assembly and a direction of the beam of said laser source are moving during said at least one pulse sequence.

23. A method for adjusting an oscillating frequency of a timepiece sprung balance assembly, said sprung balance assembly including at least one balance that includes a peripheral rim and including at least one spiral spring, said at least one balance and said at least one spring being attached to one another at a collet, wherein said sprung balance assembly is pivotable around a balance axis in a timepiece movement, and the method is for adjusting inertia and balancing said at least one balance of said timepiece sprung balance assembly, the method comprising:
    conducting a removal or a displacement of material on said sprung balance assembly by using at least one laser source to conduct a micromachining or a microfusion operation on the material of said balance under an effect of at least one pulse sequence of said laser source; and
    controlling said at least one pulse sequence by a controller configured to generate, sequence, and interrupt any pulse of said at least one laser source, wherein said controller is also configured to control movements of at least one beam discharged from said laser source, wherein said controller is automatically controlled by a measuring or comparing mechanism, wherein
    said removal or displacement of the material on said sprung balance assembly is conducted with said sprung balance assembly assembled in the timepiece movement, and wherein
    the displacement of the material within the sprung balance assembly is conducted either by localized melting followed by a displacement of a melting zone followed by solidification cooling, or by creating or relaxing internal stresses during a thermal treatment or under an effect of an external force, or by bending a deformable zone or a lug or a pin, or by spreading of the material.

24. The method according to claim 23, wherein the displacement of the material is conducted by localized melting followed by a displacement of the melting zone followed by solidification cooling, wherein the displacement of the material that is melted is conducted either by gravity, or under action of centrifugal force during adjustment of operation, or under an effect of a magnetic and/or electrostatic attraction force.

* * * * *

UNITED STATES PATENT AND TRADEMARK OFFICE
CERTIFICATE OF CORRECTION

PATENT NO. : 9,436,162 B2
APPLICATION NO. : 13/808179
DATED : September 6, 2016
INVENTOR(S) : Laurent Klinger et al.

It is certified that error appears in the above-identified patent and that said Letters Patent is hereby corrected as shown below:

On the Title Page

Item (30), the Foreign Application Priority Data Information has been omitted. Item (30) should read:
-- (30)  Foreign Application Priority Data
Jul. 16, 2010    (CH).................................01193/10
Jul. 16, 2010    (CH).................................01194/10
Jul. 16, 2010    (CH).................................01192/10
Mar. 25, 2011    (CH).................................00548/11 --

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*